UNITED STATES PATENT OFFICE.

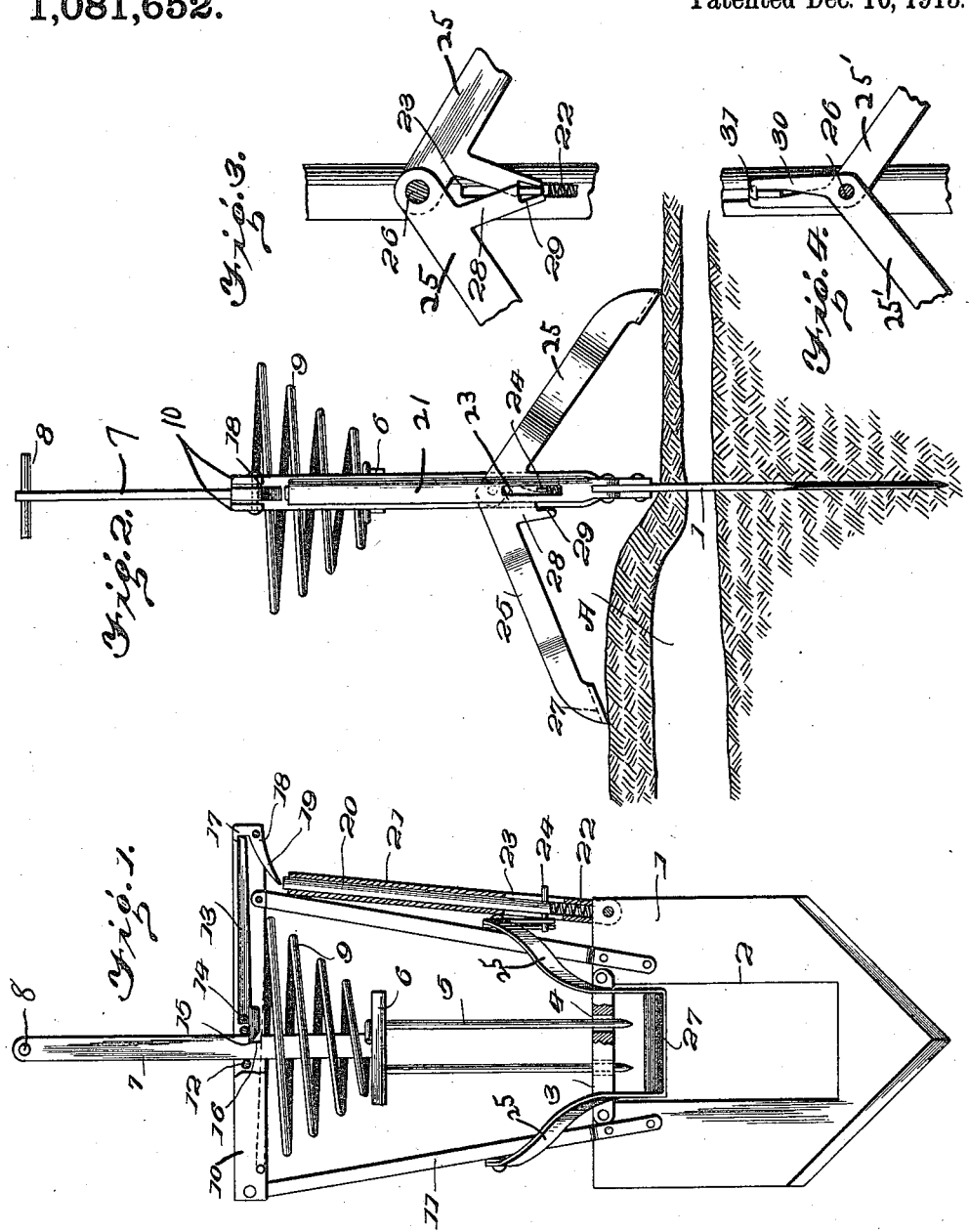

JOSEPH C. BARKER, OF OBLONG, ILLINOIS.

MOLE-TRAP.

1,081,652.  Specification of Letters Patent.  Patented Dec. 16, 1913.

Application filed April 30, 1913. Serial No. 764,611.

*To all whom it may concern:*

Be it known that I, JOSEPH C. BARKER, citizen of the United States, residing at Oblong, in the county of Crawford and State of Illinois, have invented certain new and useful Improvements in Mole-Traps, of which the following is a specification.

This invention relates to animal traps, and more particularly to a mole trap of the impalement type, and the invention is designed particularly as an improvement on the structure shown in my Patent No. 1,031,229.

It is one aim of the invention to provide a more efficient trip mechanism than that embodied in the patented structure and one which will be more certain in its action and less liable to get out of order.

For a full understanding of the invention reference is to be had to the following description and accompanying drawing, in which:—

Figure 1 is a view partly in elevation and partly in section of the trap embodying the present invention. Fig. 2 is a side elevation illustrating one of the trip members elevated. Fig. 3 is a detail view partly in elevation and partly in section illustrating the manner in which the trip members are arranged to coöperate to hold the trigger-bolt of the trap in set position. Fig. 4 is a view similar to Fig. 3 illustrating a slightly different arrangement of the parts.

Corresponding and like parts are referred to in the following description and indicated in all the views of the accompanying drawing by the same reference characters.

For the purpose of illustration the improved mole trap embodying the invention is illustrated in Fig. 2 as disposed above a mole-burrow indicated at A and the trap includes an anchoring member preferably in the form of a blade 1 adapted to be inserted into the ground and to serve as a support for the other parts of the trap, the blade being cut away as at 2 so as not to obstruct the burrow.

A bridge piece 3 is secured at its ends to the side portions of the blade and spans the upper end of the cut-away portion 2 as clearly illustrated in Fig. 1 of the drawings. The bridge 3 is formed with openings 4 through which project impaling prongs 5 which extend downwardly from and are rigid with a head 6. The head 6 is fixed at the lower end of a plunger rod 7 and the said rod is provided at its upper end with a finger-piece or handle 8 which may be grasped or with which the fingers may be engaged for the purpose of raising the bar against the tension of the spring of the trap.

The spring above mentioned is indicated by the numeral 9 and is of the spiral form and surrounds the rod 7 with its lower end resting upon the head 6 and at its upper end bearing against and secured to cross-bars 10, which extend between and connect the upper ends of the arms 11. The arms 11 are secured at their lower ends to the blade 1 and extend above the blade and at their upper ends serve to space the said bars 10. The bar 7 fits slidably between the bars 10 and between rivets or pins 12 which connect these bars and is in this manner guided in its vertical movement. It will now be apparent that when the bar 7 is pulled upwardly the spring 9 will be compressed and the impaling prongs 5 and their supporting head 6 will be correspondingly elevated and it will also be evident that when the bar 7 is released the spring 9 will immediately act to force the head 6 downwardly causing the impaling prongs 5 to pierce the ground surface and impale the animal in its burrow.

In order that the bar 7 may be held in elevated position when the trap is set, there is provided a detent indicated by the numeral 13 and pivoted as at 14 between the bars 10, the detent having a nose 15 which projects beneath one of the pins 12 and engages in a notch 16 formed in the edge of the bar 7 when the bar is in elevated position, as clearly shown in Fig. 1 of the drawings. At the opposite side of its pivot the detent is extended to form an arm lying between the arms 10 and engaged at its outer end by the nose 17 of a trigger 18. The trigger is mounted between the bars 10 for pivotal movement and the stem of the trigger indicated at 19 projects at its end directly above a trigger-bolt 20 which is slidably mounted in a sleeve 21 extending beside one of the arms 11 and upon the blade 1. A spring 22 is arranged within the lower end of the sleeve 21 and bears at one end against the upper edge of the blade 1 and at its other end against the lower end of the trigger-bolt 20. The sleeve 21 is formed at opposite points near its lower end with longitudinally extending slots 23 and a pin 24 is driven through the trigger-bolt 20 and projects at its opposite ends through the said slots 23, and this pin serves not only to limit the movement of the trigger-bolt in its sleeve but also as a stop with which the trip members of the trap may coöperate in a manner which will be presently pointed out.

The trip members mentioned above are two in number and are arranged one at each side of the blade 1 and each of these members has side portions 25 which are pivoted as at 26 to the arms 11 and include also a connecting portion 27 located opposite the cutaway portion 2 of the blade 1. It will be apparent by reference to Figs. 1 and 2 of the drawings that the trip-members are supported by the arms 11 for vertical swinging movement and that normally their connecting portions 27 rest upon the ground surface above the burrow A. The portions 25 of the trip members at one side of the trap are each provided with a downwardly projecting finger 28 having a notched lower end 29. By reference to Fig. 3 it will be apparent that the notches in the fingers oppose each other and that they are so formed as to embrace opposite sides and the upper edge of the pin 24 when the pin is in position to be so engaged.

In setting the trap the trigger-bolt 20 is forced downwardly against the tension of the spring 22 and as the pin 24 passes between the fingers 28 and the notched end of the fingers engage with the said pin, this engagement is automatic due to the tendency of the trip members to swing downwardly through gravity. The rod 7 is then pulled upwardly at the time the nose 15 of the detent has engaged in the notch 16 whereupon the end of the arm of the detent will fall into engagement beneath the nose 17 of the trigger 18. The trap is then ready for use and is inserted in the ground in the manner heretofore referred to and shown in Fig. 2. As the animal opens up his burrow, the roof of the burrow is pushed upwardly causing one of the trip members to be swung in a corresponding direction which will bring the finger 28 out of engagement with the pin 24. The animal may then continue to open up his burrow until the roof has been raised sufficiently to swing the other one of the trip members upwardly to such an extent as to cause its fingers 28 to disengage from the pin 24, whereupon the trigger-bolt 20 will immediately act to move the trigger to position to release the detent 13. The spring 9 will then, as before stated, force the impaling prongs 5 into the burrow and through the animal's body.

In the form of the invention shown in Fig. 4 of the drawings, the side members 25' are provided at their pivoted ends with upwardly extending fingers 30 located above the pivot for the said portions and the said fingers at their upper ends are provided with lugs 31 which engage over the upper edge of the cross-pin 24. It will be seen that the operation of this form of the invention is practically the same as the form shown in Fig. 3 in which the fingers extend downwardly.

Having thus described the invention what is claimed as new is:—

1. In a trap, a support, an impalement member mounted thereon, means for moving the impalement member, a detent arranged to hold the said member in set position, a trigger engageable with the detent to hold the same against movement to release position, a trigger-bolt arranged for coöperation with the said trigger, means for moving the trigger bolt, and means for holding it against movement comprising a trip member pivoted to the support and arranged upon forward swinging movement to release the bolt.

2. In a trap, a support, an impalement member mounted thereon, means for moving the impalement member, a detent arranged to hold the said member in set position, a trigger engageable with the detent to hold the same against movement to release position, a trigger bolt arranged for coöperation with said trigger means for moving the trigger bolt, a stop carried by the trigger-bolt, and means for holding the trigger-bolt against movement comprising a trip member mounted upon the support for swinging movement and having a finger adapted, when the trip member is in lowered position, to engage with the stop upon the trigger-bolt.

3. In a trap, a support, an impalement member mounted thereon, means for moving the impalement member, a detent arranged to hold the said member in set position, a trigger engageable with the detent to hold the same against movement to release position, a trigger-bolt arranged for coöperation with said trigger, means for moving the trigger-bolt, and trip members pivoted on the support and extending at opposite sides thereof and arranged to hold the trigger-bolt in set position and to release the same when successively swung upwardly.

In testimony whereof I affix my signature in presence of two witnesses.

JOSEPH C. BARKER. [L. S.]

Witnesses:
K. E. SHIRE,
ROBT. S. COMLY.